United States Patent [19]

Radu et al.

[11] Patent Number: 5,952,277
[45] Date of Patent: Sep. 14, 1999

[54] AROMATIC HYDROCARBONS, DIMETHYLFORMAMIDE AND N-METHYL PYRROLIDONE -CONTAINING, PAINT REMOVING COMPOSITION

[75] Inventors: Georges Radu, Brossard, Canada; Shizuo Maruyama, Osaka, Japan

[73] Assignees: Asahipen Corporation, Osaka, Japan; E.QU.I.P. International, Inc., Baie D'Urfe, Canada

[21] Appl. No.: 08/793,083

[22] PCT Filed: Aug. 14, 1995

[86] PCT No.: PCT/CA95/00480

§ 371 Date: Feb. 18, 1997

§ 102(e) Date: Feb. 18, 1997

[87] PCT Pub. No.: WO96/06140

PCT Pub. Date: Feb. 29, 1996

[30] Foreign Application Priority Data

Aug. 19, 1994 [CA] Canada .................................. 2130490

[51] Int. Cl.[6] .................................. C09D 9/00; C11D 7/50
[52] U.S. Cl. ........................ 510/212; 510/202; 510/213; 510/500
[58] Field of Search .................................... 510/212, 213, 510/201, 202, 500

[56] References Cited

U.S. PATENT DOCUMENTS

| | | | |
|---|---|---|---|
| 4,120,810 | 10/1978 | Palmer | 252/153 |
| 4,983,224 | 1/1991 | Mombrun et al. | 134/40 |
| 5,011,621 | 4/1991 | Sullivan | 252/162 |
| 5,030,290 | 7/1991 | Davis | 134/4 |
| 5,298,184 | 3/1994 | Jarema | 252/171 |
| 5,308,527 | 5/1994 | Lallier et al. | 252/162 |
| 5,565,136 | 10/1996 | Walsh | 510/203 |

FOREIGN PATENT DOCUMENTS

| | | |
|---|---|---|
| 32 24 687 | 7/1983 | Germany . |
| 3224687 | 7/1983 | Germany . |

*Primary Examiner*—Christine Skane
*Attorney, Agent, or Firm*—McDermott, Will & Emery

[57] ABSTRACT

A synergistic paint removing composition is disclosed which comprises a particular selection of a plurality of known solvents in very specific proportions, namely: from 20 to 45% of aromatic hydrocarbons; from 15 to 25% of dimethylformamide; from 15 to 25% of N-methyl pyrrolidone; from 5 to 15% of a water-immiscible compound selected from the group consisting of terpene derivatives, oleoresins and mixtures thereof; and from 0.5 to 4% of at least one wetting agent, all the above percentages being expressed by weight. This composition is partially miscible in water even though some of its constituents are not water miscible, thereby making the composition easy to wash and thus preventing oily film to be left on the treated substrate. The composition according to the invention is normally in a liquid form. If desired, for some applications, a thickening agent can be added thereto to convert it to a gel.

13 Claims, No Drawings

AROMATIC HYDROCARBONS, DIMETHYLFORMAMIDE AND N-METHYL PYRROLIDONE -CONTAINING, PAINT REMOVING COMPOSITION

The present invention broadly relates to new compositions usually referred to as "paint removers" in the trade, which are used for removing paint from a substrate, such as wood, metals, like iron or steel, or plastic material like polypropylene.

More particularly, the invention relates to a new paint removing composition comprising a plurality of known solvents and paint removers which are mixed in suitable amounts, and altogether "cooperate" in a synergistic manner to give very efficient results for removing paint from a substrate. This composition is particularly efficient with respect to paints comprising as monomer or comonomer at least one monomer selected from the group consiting of urethane, melamine and epoxy monomers, and with respect to paints defining a powder coating (especially a powder coating of polyester isocyanate.

As aforesaid, numerous products are known and presently available in the market as solvents and/or paint removers. However, most of these known products are restricted to very specific uses (some are efficient with given types of paint while others are efficient with other types of paint). Most of the known products also are either hydrophobic or hydrophillic, thereby further restricting their uses.

Furthermore, the Applicant has disclosed in his co-pending Canadian patent application serial no. 2,121,017 of Apr. 11, 1994 a paint removing composition comprising a plurality of known solvents and paint removers which are mixed in suitable amounts, and altogether "cooperate" in a synergistic manner to give very efficient results for removing paint from a substrate.

The object of the present invention is to provide a synergistic paint removing composition which incorporates a plurality of known solvents and/or paint removers together with one or more suitable wetting agents, and which is surprisingly still more efficient than the paint removing composition making the object of the Applicant's co-pending Canadian patent application serial no. 2,121,017, especially with respect to urethane based paints, melamine based paints, epoxy based paints and powder coating paints.

The invention is based on the discovery that if some very specific solvents and paint removers known per se are mixed in very specific amounts, the resulting composition exhibits an excellent paint removing action which is actually better than the paint removing action of each solvent or paint remover when taken separately or the paint removing composition of the Applicant's co-pending Canadian patent application serial no. 2,121,017, whatever be the type of paint to be removed or the substrate onto which this paint has been applied. The invention is also based on the discovery that when the same, very specific solvents and paint removers are mixed in said very specific amounts, the resulting composition is partially miscible in water even though some of its constituents are not water miscible, thereby making the composition easy to wash and thus preventing oily film to be left on the treated substrate.

The synergistic paint removing composition according to the invention basically comprises:

from 20 to 45% of aromatic hydrocarbons;
from 15 to 30% of dimethylformamide;
from 15 to 25% of N-methyl pyrrolidone;
from 5 to 15% of a water-immiscible compound selected from the group consisting of terpene derivatives, oleoresins and mixtures thereof; and a wetting agent, consisting essentially of 0.5 to 4% of a compound selected from the group consisting of $C_{12}$–$C_{15}$ alcohols, ethoxylated $C_{12}$–$C_{15}$-alcohols and their mixtures, and of 0.5 to 2% of an ethoxylated nonylphenol derivative of the formula:

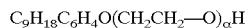

$C_9H_{18}C_6H_4O(CH_2CH_2{-}O)_\alpha H$ where $\alpha$ is an integer ranging from 4 to 11.

In the above formulation as well as everywhere else in the following description and accompanying claims, the percentage is expressed by weight unless otherwise specified.

Preferably, the water immiscible compound is selected from the group consisting of d-limonene, dipentene, terpinolene, terpene alcohols, pine oil, turpentine oil and their mixtures. The preferred compounds are d-limonene, terpene alcohols and pine oil, the most preferred one being d-limonene.

The composition according to the invention is normally in a liquid form. If desired, for some applications, a thickening agent can be added thereto to "convert" it to a gel. As a thickening agent, use can be made of up to 1.2% by weight and preferably of 0.78% of hydroxypropyl methyl cellulose.

The composition according to the invention whatever be its form is preferably incolor. However, it may optionally also contain up to 0.05% of a pigment to color it.

As aforesaid, the composition according to the invention is very efficient as a paint remover, whatever be the type of paint and type of substrate for it. Tests carried out by the Applicant have shown that its viscosity and gel stability (when in the form of a gel) are very good, even after two weeks at 50° C. No metal corrosion has been noticed, even after 3 months. Since the constituents of the composition do not contain fluoride, it does not cause ozone layer depletion. Its toxicity is low and its biodegradability complete. As a matter of fact, the composition according to the invention is both combustible and recyclable. As aforesaid, it is partially miscible with water and thus easily washable, with no oily film left.

Also, the composition according to the invention may advantageously show the following advantages:

it is very efficient with respect to urethane based paints than melamine based paints;

has a low flash point, preferably lower than 60° C.

COMPARATIVE TESTS

To show the efficiency of the composition according to the invention, comparative tests were carried out between a composition according to the invention, and the Applicant's co-pending Canadian patent application serial no. 2,121,017. These test were carried out onto different paints applied in one or more layers onto a substrate. The nature of the substrate supporting the paints is the same for all the following tests and the nature of said substracte has no effect on the efficiency of the composition.

The composition of the Applicant's co-pending Canadian patent application that was used for these tests had the following formulation:

about 41.5% of N-methyl pyrrolidone like the one sold by BASF, GAF or ARCO;
about 12% of dibasic ester like the one sold by Dupont;
about 17.5% of d-limonene like the one sold by Cargill (Brazil), VanWaters & Rogers or Cedarome;
about 16% of dimethylformamide (sold by VanWaters & Rogers);
about 7.2% of γ-butyrolactone like the one sold by BASF, GAF or ARCO;

about 2% of ethylene glycol monoethyl ether acetate (sold under the trade mark "Cellosolve" by VanWaters & Rogers);

about 2% of ethoxylated $C_{12}$–$C_{15}$ alcohol (laurylic alcohol/ethoxylated pentadecanol mixture sold by Rhône-Poulenc under the trade mark "Rhodasurf 25-3");

about 1% of nonyl phenol etlioxylate like the one sold by Rhône Poulenc under the trade mark "Rhodasurf NP", by Union Carbide under the trade mark "Tergitol NP-9" or VanWater & Rogers under the trade mark "Surfonic NP-95";

about 0.8% by weight of hydroxypropylmethyl cellulose like the one sold by Dow Chemicals under the trade mark "Methocel 311", whereby the composition was in the form of a gel.

The paint removing composition according to the invention that was used for these tests had the following formulation:

about 38% of aromatic hydrocarbons like the one sold by PETRO CANADA under the trade mark PETROSOL 100 (alternatively it is possible to replace this product by the one sold by ASHLAND CHEMICALS under the trade mark HI SOL 10);

about 30% of dimethylformamide (sold by VanWaters & Rogers);

about 20% of N-methyl pyrrolidone like the one sold by BASF, GAF or ARCO;

about 10% of d-limonene as said water-immiscible compound like the one sold by Cargill (Brazil), VanWaters & Rogers or Cedarome;

about 1% of said ethoxylated $C_{12}$–$C_{15}$ alcohol (laurylic alcohol/ethoxylated pentadecanol mixture sold by Rhône-Poulenc under the trade mark "Rhodasurf 25-3" and also known under the common designation LA3);

about 1% of said ethoxylated nonyl phenol like the one sold by Rhône Poulenc under the trade mark "Rhodasurf NP", by Union Carbide under the trade mark "Tergitol NP-9" or VanWater & Rogers under the trade mark "Sufonic NP-95".

In the above compositions, N-methylpyrrolidone, γ-butyrolactone and dimethylformamide are known to be water-miscible industrial solvents and paint removers that are chiefly effective on water-based varnish, water-based wall paint, water-based roof paint, water-based floor paint, water-based multilayer paint and water-based acrylic. However, dibasic ester, d-limonene and "Cellosolve" are paint removers not miscible with water, which are chiefly effective on acrylic, urethane, long oil alkyd and alkyd polyurethane paints.

In addition of being as efficient as the Applicant's paint removing composition of co-pending Canadian patent application paints selected from the group consisting of long oil alkyd paint, alkyd polyurethane paint, water-based varnish, water-based wall paint, water-based roof paint, water-based floor paint, water-based multi-layer paint and water-based acrylic mastic paint, the paint removing composition according to the invention further shows, the following improved results with respect to the paint removing composition of co-pending Applicant's Canadian patent application serial no. 2,121,017. These improved results are reported in the following table.

TABLE

| PAINTS | | PAINT REMOVING COMPOSITIONS | |
|---|---|---|---|
| kind | brand | according to the invention | according to Canadian Patent Application serial no. 2,121,017 |
| Acrylic urethane | ASAHIPEN OLEOFIX #7000 | lifted 25–50 min | soften 1 hr |
| Acrylic melamine, Solid colors | HIYOKO Modified Epoxy | lifted 15–20 min. | lifted 1 hr |
| Acrylic melamine, Metalic colors | TANABE | surface soften 1 hr | no change |
| Alkyd melamine | HIYOKO modified | lifted 5 min | lifted 10 min |
| Epoxy | KUBOKO | lifted 50–60 min | lifted 120 min |
| Powder Coating, Polyester isocyanate | KUBOKO | surface soften 2 hrs | no change |

It is to be noted that the same results than those reported hereinbefore are obtained when the composition of Canadian patent application 2,121,017 and the composition according to the invention, are colored with 0.01% of green copper phtalocyanine pigment like those sold by BASF under the trade marks "Bayanil" and "Levanil green".

The embodiments of the invention in which an exclusive right of property and priviledge is claimed, are defined as follows:

1. A synergistic paint removing composition consisting essentially of:
   from 20 to 45% of aromatic hydrocarbons;
   from 15 to 30% of a dimethylformamide;
   from 15 to 25% of N-methyl pyrrolidone;
   from 5 to 15% of a water-immiscible compound selected from the group consisting of terpene derivatives, oleoresins and mixtures thereof; and
   from 0.5 to 4% of a wetting agent selected from the group consisting of $C_{12}$–$C_{15}$ alcohols, ethoxylated $C_{12}$–$C_{15}$- alcohols and their mixtures, and from 0.5 to 2% of an ethoxylated nonylphenol derivative of the formula:

$$C_9H_{18}C_6H_4O(CH_2CH_2\!-\!O)_\alpha H$$

where α is an integer ranging from 4 to 11;
all the above mentioned percentages being expressed by weight.

2. The composition of claim 1, wherein the water immiscible compound is selected from the group consisting of d-limonene, dipentene, terpinolene, terpene alcohols, pine oil, turpentine oil and their mixtures.

3. The composition of claim 2, wherein the water immiscible compound is d-limonene.

4. The composition of claim 2, further consisting essentially of up to 0.05% of a pigment.

5. The composition of claim 4, wherein the pigment is copper phtalocyanine.

6. The composition of claim 2, further consisting essentially of up to 1.2% of thickening agent, whereby said composition is in the form of a gel.

7. The composition of claim 6, wherein the thickening agent is hydroxypropylmethyl cellulose.

8. A synergistic paint removing composition consisting essentially of:

from 20 to 45% of aromatic hydrocarbons;

from 15 to 30% of dimethylformamide;

from 15 to 25% of N-methyl pyrrolidone;

from 5 to 15% of a water immiscible compound selected from the group consisting of d-limonene, terpene alcohols and pine oil;

from 0.5 to 2% of an ethoxylated $C_{12}$–$C_{15}$ alcohol as wetting agent; and from 0.5 to 2% of a ethoxylated nonyl phenol derivative as wetting agent all the percentages being expressed by weight.

9. The composition of claim 8, further consisting essentially of up to 0.05% of a pigment.

10. The composition of claim 8, further consisting essentially of up to 1% by weight of hydroxypropylmethyl cellulose, whereby said composition is in the form of a gel.

11. A synergistic paint removing composition consisting essentially of:

about 38% of aromatic hydrocarbons;

about 30% of dimethylformamide;

about 20% of N-methyl pyrrolidone;

about 10% of d-limonene as a water-immiscible compound;

about 1% of an ethoxylated $C_{12}$–$C_{15}$ alcohol; and about 1% of an ethoxylated nonyl phenol derivative, all the percentages being expressed by weight.

12. The composition of claim 11, wherein it further consisting essentially of about 0.01% of green copper phtalocyanine as a pigment.

13. The composition of claim 12, further consisting essentially of up to 1% by weight of hydroxypropylmethyl cellulose, whereby said composition is in the form of a gel.

* * * * *